United States Patent [19]
Voigts et al.

[11] Patent Number: 6,115,230
[45] Date of Patent: Sep. 5, 2000

[54] METHOD AND APPARATUS FOR DETECTING ARCS AND CONTROLLING SUPPLY OF ELECTRICAL POWER

[75] Inventors: Ronald D. Voigts, Cary; Dennis G. Florit, Sanford, both of N.C.

[73] Assignee: Trion, Inc., Sandford, N.C.

[21] Appl. No.: 09/351,255

[22] Filed: Jul. 12, 1999

Related U.S. Application Data

[63] Continuation-in-part of application No. 09/017,659, Feb. 3, 1998, abandoned.
[51] Int. Cl.⁷ .................................................. H01T 23/00
[52] U.S. Cl. ................................ 361/230; 361/59; 361/1; 361/2; 96/20
[58] Field of Search .................... 361/2, 3, 4, 1, 361/8, 113, 59, 230–233; 324/520, 536; 96/20, 18, 15

[56] References Cited

U.S. PATENT DOCUMENTS

| | | |
|---|---|---|
| 5,280,404 | 1/1994 | Ragsdale . |
| 5,418,463 | 5/1995 | Fleming et al. . |
| 5,432,455 | 7/1995 | Blades . |
| 5,619,105 | 4/1997 | Holmquest . |
| 5,629,824 | 5/1997 | Rankin et al. . |
| 5,706,159 | 1/1998 | Dollar, II et al. . |

*Primary Examiner*—Josie Ballato
*Assistant Examiner*—Kim Huynh
*Attorney, Agent, or Firm*—Burns, Doane, Swecker and Mathis, L.L.P.

[57] ABSTRACT

A method and apparatus for detecting electromagnetic noise generated by an arc and controlling a power supply that powers the arcs. In an embodiment of the invention, the apparatus includes an arc detection circuit and a power supply control circuit. The arc detection circuit includes an antenna and a single shot timer. Electromagnetic noise generated by an arc is received by the antenna and activates the single shot timer, which causes the power supply control circuit to interrupt the power supply powering the arc for a predetermined length of time. A microprocessor can be used together with, or instead of, the single shot timer.

8 Claims, 7 Drawing Sheets

METHOD AND APPARATUS FOR DETECTING ARCS AND CONTROLLING SUPPLY OF ELECTRICAL POWER

This application is a Continuation-In-Part of U.S. patent application Ser. No. 09/017,659 filed in the U.S. Patent and Trademark Office on Feb. 3, 1998, now abandoned; which is hereby incorporated by reference in its entirety.

BACKGROUND OF THE INVENTION

1. Field of the Invention

The present invention relates generally to detecting and controlling electrical arcs, and specifically to detecting and controlling electrical arcs occurring in a cleaning cell of an electronic air cleaner.

2. Description of Related Art

Electronic air cleaners are currently available that filter particles from the air by charging the particles so that they have an electrostatic charge, and then passing the charged particles between high voltage plates. The plates have an electric potential between them, and the charged particles are attracted to and collected on the plate that has a polarity opposite to the charge on the particles. Thus, the particles are removed from the air. For example, if the particles are given a positive charge and then passed between two plates that have an electric potential between them, the particles will be attracted to the plate that is connected to the lesser voltage.

Arcing can occur when accumulated debris narrows an effective gap between the high voltage plates. Since the electric potential between the plates is typically large, for example at least several thousand volts, when the effective gap becomes small an arc will occur along a path across the gap. Current flows between the plates along the path, generating a high rate of change in current flow, i.e., a large dI/dt. The large dI/dt creates a burst of electromagnetic noise that often has frequency components in the 300 kHz range, a short duration on the order of several microseconds or less, and a relatively high local intensity in comparison to other electromagnetic signal sources when measured near the arc. This electromagnetic noise burst often interferes with the electronics within the air cleaner as well as with other electrical devices near the air cleaner, such as television sets, radios, and personal computers. The burst of electromagnetic noise resulting from the arcing affects digital circuits and microprocessors, because the conductive components in the circuit and microprocessors act as antennae that receive the noise signal and generate erroneous pulses. These erroneous pulses cause the digital circuits and microprocessors to reset or malfunction in unpredictable ways.

In addition, sound created by arcing in an electronic air cleaner can be especially annoying to a user because arcs typically occur in rapid succession. The arc ionizes the air in the immediate vicinity of arc's path, which increases the conductivity of the path and therefore the likelihood that subsequent arcs will occur. Where the arcing is caused by large debris trapped between cell plates in the air cleaner, arcing can continue indefinitely until the debris either burns away or falls from between the cell plates, or until a user disconnects the air cleaner's power source.

Arcing can also be undesirable for other reasons. For example, arcing generates ozone which can be harmful. Arcing can also overload the air cleaner power supply as well as consume unnecessary amounts of electrical power.

OBJECTS AND SUMMARY

The invention solves the foregoing problems and provides additional advantages, by providing a method and apparatus for detecting arcs and controlling a power supply that powers the arcs. In accordance with an exemplary embodiment of the invention, an arc detection circuit and a power supply control circuit are provided. The arc detection circuit includes an antenna, a filters and a single shot timer. The antenna receives a portion of the electromagnetic noise generated by an arc. The antenna is connected to the filter, which filters out received signals not generated by the arc. An output of the filter is provided to the single shot timer, and an output of the single shot timer is provided to the relay control circuit. When activated, the power supply control circuit stops the arcing by disconnecting the power supply. When the timer receives a signal from the antenna via the filter that corresponds to an arc, the timer generates a pulse that endures for a predetermined amount of time. The pulse activates the power supply control circuit, which disconnects the power supply until the timer ceases to generate the pulse. Thus, arcing can be reduced.

According to another exemplary embodiment, a microprocessor can be provided between the single shot timer and the power supply control circuit, to allow for more sophisticated control of the power supply in response to detected arcing. For example, the microprocessor can be configured to vary the time during which the power supply is disconnected, depending on how often the arcs occur. The microprocessor can also be configured to initiate other actions when arcing conditions exceed predetermined parameters. For example, when arcing occurs the microprocessor can be configured to generate a warning signal to alert a user, and/or initiate an automatic wash cycle to flush away debris that has collected in the region where the arcs are occurring.

According to another exemplary embodiment, an additional filter is provided to prevent transients in a power source supplying the arc detection circuit from causing the arc detection circuit to erroneously detect an arc.

Additional features and advantages of the invention will become apparent from the following description of the preferred embodiments, taken in conjunction with the accompanying drawings. The accompanying drawings illustrate, by way of example, the principles of the invention. Like elements are designated with like reference numerals. Like elements in the drawings have been designated by like reference numerals.

DETAILED DESCRIPTION OF THE PREFERRED EMBODIMENTS

Figure 1:
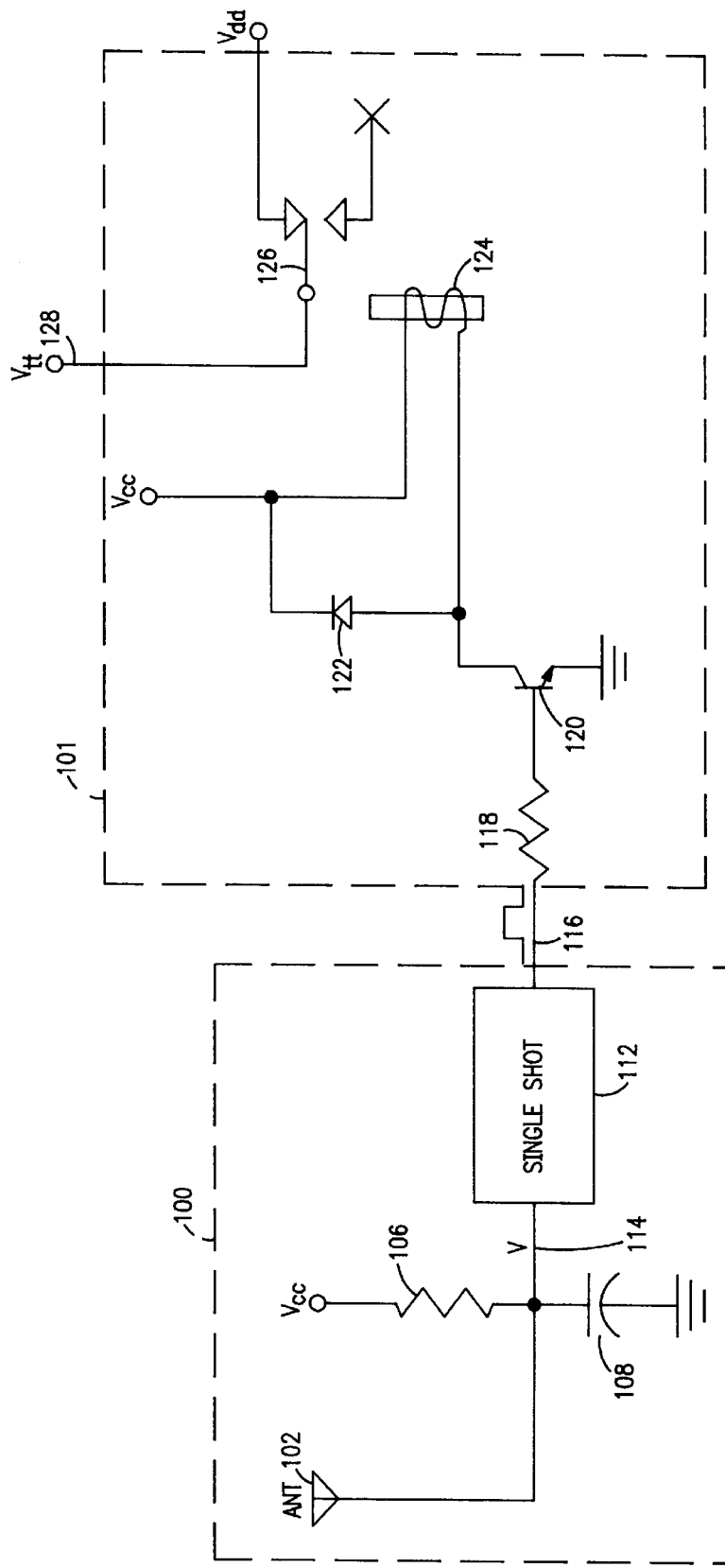
FIG. 1 is a block circuit diagram of an arc detection circuit and a power supply control circuit according to a first embodiment of the invention.

FIG. 1 shows a block circuit diagram of a first preferred embodiment of the invention for use in an electric air cleaner having a high-voltage power supply, which includes an arc detection circuit 100 and a power supply control circuit 101. The arc detection circuit 100 includes an antenna 102 connected to a single shot timer 112 via a filter formed by a filter resistor 106 and a filter capacitor 108. The power supply control circuit 101 includes an input resistor 118 connected between an output line 116 from the single shot timer 112, a transistor 120, a diode 122, a solenoid coil 124 and a normally-closed solenoid switch 126.

The voltage Vdd shown in FIG. 1 is the voltage provided by a power supply for the air cleaner, and is always present during normal operation of the air cleaner. The voltage Vtt is a switchable output of the power supply, and can be turned off or on by the power supply control circuit 101. The voltage Vcc is a voltage that is derived from the voltage Vdd and used to power the solenoid coil 124 and the filter formed by the filter resistor 106 and the filter capacitor 108. The voltage Vcc is also used to power integrated circuits (IC's) within the air cleaner and provide a logic voltage level source for any digital circuits incorporated in the air cleaner.

In operation, the antenna 102 receives an electromagnetic noise signal produced by an arc. The signal passes through the filter formed by the resistor 106 and the capacitor 108 to the input line 114 of the single shot timer 112. In response to the signal, the single shot tinier 112 outputs a pulse on the output line 116 for a predetermined amount of time. The pulse on the output line 116 turns the transistor 120 on so that current flows through the transistor 120 and the solenoid coil 124, thus causing the solenoid coil 124 to operate as an electromagnet that opens the solenoid switch 126 and disconnects the power supply line 128. When the predetermined amount of time expires, the single shot timer 112 stops outputting the pulse, the transistor 120 turns off, and the solenoid switch 126 closes to reconnect the power supply line 128. The diode 122 provides a path for receiving current produced when the magnetic field generated by the solenoid coil collapses after the transistor 120 is turned off.

The filter resistor 106 and the filter capacitor 108 together form a filter for filtering out transients not caused by an arc. The filter resistor 106 is selected so that its resistance is large enough to prevent the single shot timer 112 from being triggered by normal transients caused by the system turning on or by electromagnetic signals from other sources such radio stations, cordless phones, and so forth. However, the resistor 106 is also selected so that its resistance is small enough to allow electromagnetic noise due to arcing to be reliably detected. For example, the filter resistor 106 can be chosen to have a value near 100 kilohms. The filter capacitor 108 offers additional immunity to undesired transients, and is typically small in value. For example, the filter capacitor 108 can be selected to have a capacitance near 0.02 microfarads. However, the filter capacitor 108 and the filter resistor 106 can have other values consistent with particular applications of the invention. In many cases, the filter capacitor 108 can be omitted. This is because the conductive paths of the arc detection circuit 100, particularly when implemented on a printed circuit board, have a sufficient amount of inherent capacitance to form an effective filter with the filter resistor 106.

According to an embodiment of the invention, the single shot timer 112 and the resistance value of the resistor 118 are chosen so that the pulse output from the single shot timer 112 has sufficient amplitude to drive the transistor 120 into saturation. The predetermined amount of time that the single shot timer outputs a pulse can be chosen according to specific requirements for a particular application. For example, in one embodiment the predetermined amount of time can be between 4 and 10 seconds, to allow the arc to fully subside and the ionized path across which the arc passed to fully dissipate.

The single shot timer 112 can be implemented using an IC such as a 555 timer. Other circuits or IC's capable of performing the same function can alternatively be used, in accordance with single shot timer designs and operating principles well known in the electrical arts.

Figure 2:
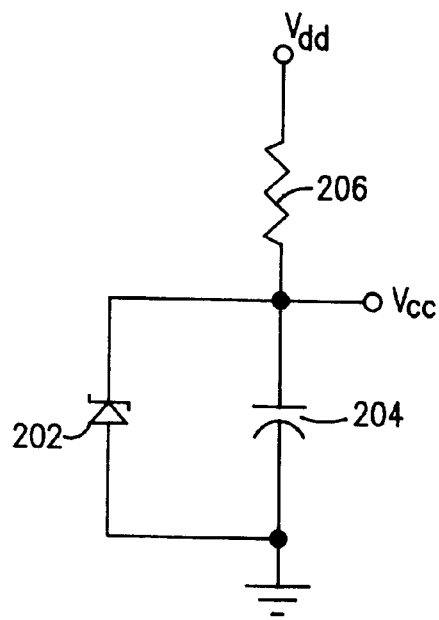
FIG. 2 is a block circuit diagram of a filter for filtering power supplied to the arc detection circuit.

A power line filter such as that shown in FIG. 2 can also be provided, to prevent non-arc related transients that occur on a power line (not shown) supplying the arc detection circuit 100 from adversely affecting performance of the arc detection circuit. As shown in FIG. 2, resistor 206 and capacitor 204 together form a low-pass filter to suppress transients. A zener diode 202 acts as a voltage clamp to further limit transients. The power line filter shown in FIG. 2 also doubles as a voltage regulator for providing the voltage Vcc given the source voltage Vdd.

Figure 3:
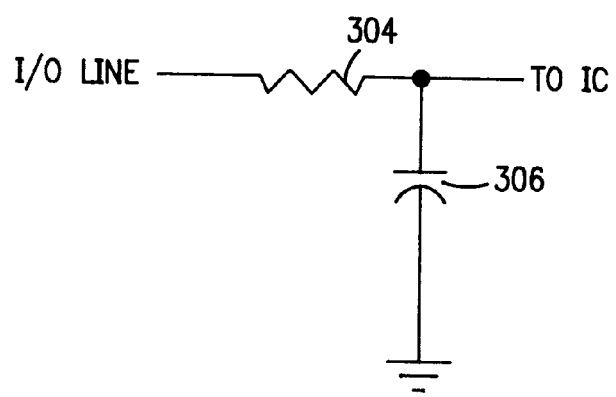
FIG. 3 is a circuit diagram of a conventional low-pass filter typically used on an input/output line of an integrated circuit.

Depending on the IC or circuit chosen to implement the single shot timer 112, other inputs (not shown) to the single shot timer 112 besides the input line 114 might require an input/output (I/O) line filter such as that shown in FIG. 3, to ensure proper operation of the single shot timer 112. The other inputs might be, for example, inputs that configure the single shot timer 112 and that should be free of transients from arcs or other sources. As shown in FIG. 3, a resistor 304 is connected between the input line and the IC, and a capacitor 306 connects the junction between the resistor 304 and the IC to ground. Other IC's or circuits used in the arc detection circuit 100 might also require an I/O line filter such as that shown in FIG. 3, for similar reasons.

Figure 4:
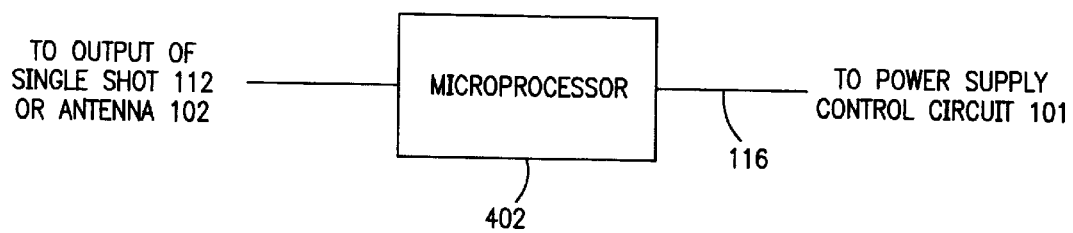
FIG. 4 is a block circuit diagram showing a microprocessor connected between an output of either an antenna or a single shot timer, and an input of a power supply control circuit.

In another embodiment of the invention, a microprocessor 402 is connected between the single shot timer 112 and the output line 116 to the power supply control circuit 101 as shown in FIG. 4. The microprocessor 402 allows the power supply to the arc source to be controlled with greater sophistication. For example, the microprocessor can vary the time during which the power supply is disconnected, depending on how often the arcs occur. For example, the disconnect time can be based on how much time elapsed between the most recent two arcs, or on how many arcs occur within a predetermined period of time. The microprocessor can also be configured to initiate other actions when arcing conditions exceed predetermined parameters. For example, when arcing occurs the microprocessor 402 can be configured to generate a warning signal to alert a user, and/or initiate an automatic wash cycle to flush away debris that has collected in the region where the arcs are occurring. The microprocessor 402 can also be used to create a record of arc occurrences over a period of time. This record can be used, for example, to schedule or evaluate periodic maintenance of the electric air filter, or to troubleshoot the filter when performing repairs.

Figure 8:
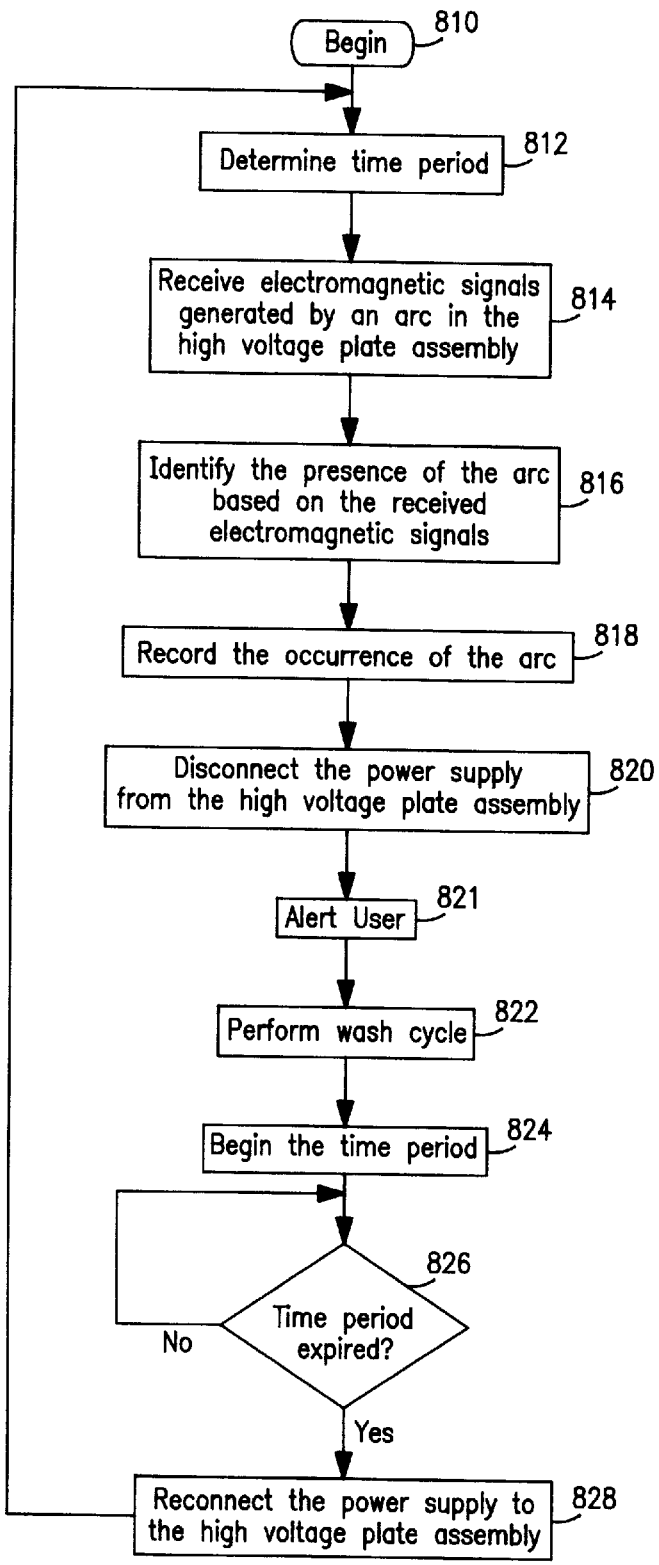
FIG. 8 is a flow chart corresponding to an exemplary embodiment of the invention.

FIG. 8 shows a flowchart of an exemplary embodiment of the invention, beginning with step 810. After step 810, control proceeds to step 812 where a time period is determined, for disconnecting the power supply from the high voltage plate assembly upon detection of an arc within the high voltage plate assembly. As described above, the time period can have a fixed duration, for example between 4 and 10 seconds, to allow the arc to fully subside and the ionized path across which the arc passed to fully dissipate. Alternatively, the time period can have a duration that varies from arc to arc and is based on how much time elapsed between the most recent two arcs, or on how many arcs occur within a predetermined period of time.

From step 812, control proceeds to step 814, where electromagnetic signals generated by an arc in the high voltage plate assembly are received by the antenna. From step 814, control proceeds to step 816, where the presence of an arc is identified based on the received electromagnetic signals. From step 816, control proceeds to step 818, where the arc occurrence is recorded. From step 818, control proceeds to step 820, where the power supply is disconnected from the high voltage plate assembly. From step 820, control proceeds to step 821, where a warning signal is generated to alert the user of the occurrence of one or more arcs. From step 821, control proceeds to step 822, where a wash cycle is performed to remove debris from the high-voltage plate assembly. From step 822, control proceeds to step 824, where the time period determined in step 812 is begun. From step 824, control proceeds to step 826, where a determination is made as to whether the time period has expired. If no, then control remains at step 826. If yes, then control proceeds from step 826 to step 828, where the power supply is reconnected to the high voltage plate assembly. From step 828, control returns to step 812.

Depending on the configuration of the filter formed by the resistor 106 and the capacitor 108 and on how the input of the microprocessor 402 is internally buffered and configured, the microprocessor 402 can replace instead of augment the single shot timer 112. In addition, a signal output from the antenna 102 could be otherwise conditioned for input to the microprocessor, in accordance with techniques well known in the electrical arts. For example, the signal could be input to a threshold device which would output a digital signal while the input signal from the antenna remained above a threshold.

Figure 5:
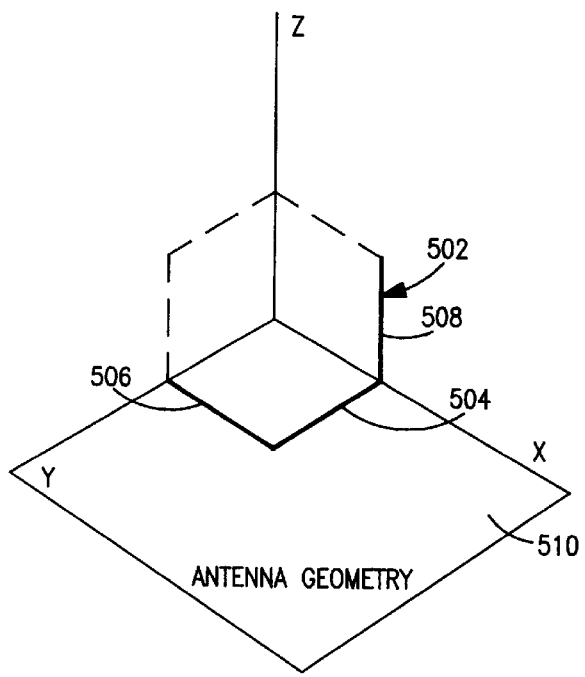
FIG. 5 illustrates an exemplary antenna configuration consistent with the invention.

The antenna 102 can be configured in different ways. According to an embodiment of the invention, the antenna 102 is configured in a shape 502 as shown in FIG. 5, so that portions of the antenna 102 lie in each of three mutually perpendicular planes. For example, the antenna can be formed using conductive traces 504, 506 along two axes x, y of a printed circuit board (PCB) 510, with an additional segment 508 of the antenna looping away from and then back toward the PCB 510 in a direction substantially perpendicular to the PCB 510. The length of the loop 508 and the lengths of the conductive traces on the PCB 510 can affect the sensitivity of the antenna, and thus can be chosen to obtain an antenna with a desired sensitivity that matches the filter formed by the filter resistor 106 and the filter capacitor 108. The antenna 102 can also be placed at different locations in the electric air filter relative to the arc source, based for example on factors such as available space within the air filter given a specific physical configuration of air filter components, and relative strength of arc-sourced electromagnetic signals at different locations within the available space. In addition, the antenna can also be configured differently, for example in a toroid.

Figure 6:
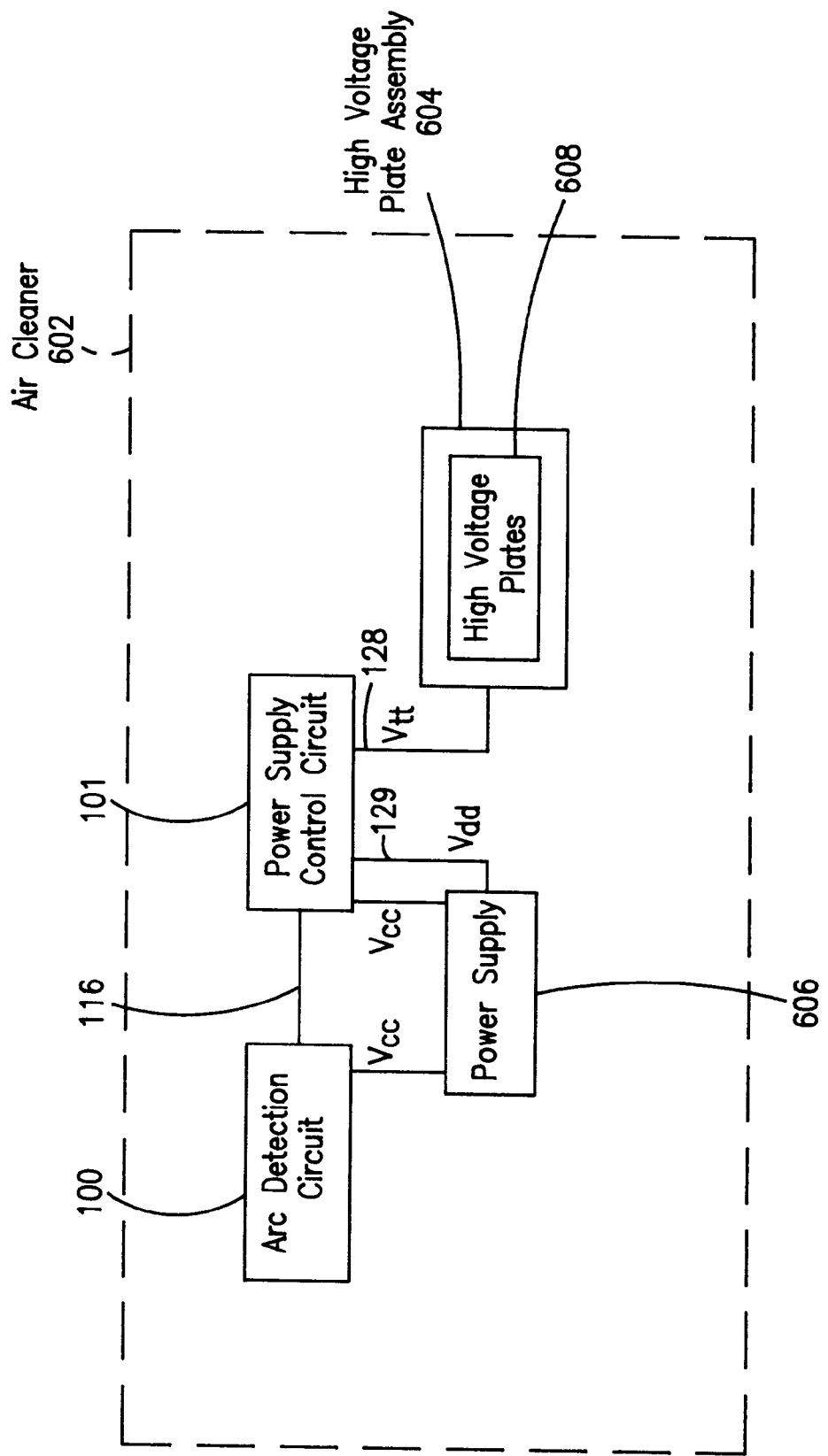
FIG. 6 illustrates a block diagram of internal components within an electrostatic air cleaner in accordance with an embodiment of the invention.

FIG. 6 shows a block diagram of an electrostatic air cleaner 602 in accordance with an embodiment of the invention, including the arc detection circuit 100, the power supply control circuit 101, a power supply 606, and a high voltage plate assembly 604 including high voltage plates 608. The power supply 606 supplies a voltage $V_{dd}$ to the power supply control circuit 101 on line 129. Thus, when the solenoid switch 126 is closed, power is provided to the high voltage plate assembly 604, for example on line 128. When the solenoid switch 126 is open, power is not provided to the high voltage plate assembly 604 and the high voltage plates 608. As can be seen, the various connections among the arc detection circuit 100, the power supply control circuit 101, the power supply 606 and the high voltage plate assembly 604 are connected in a fashion consistent with FIG. 1.

Figure 7:
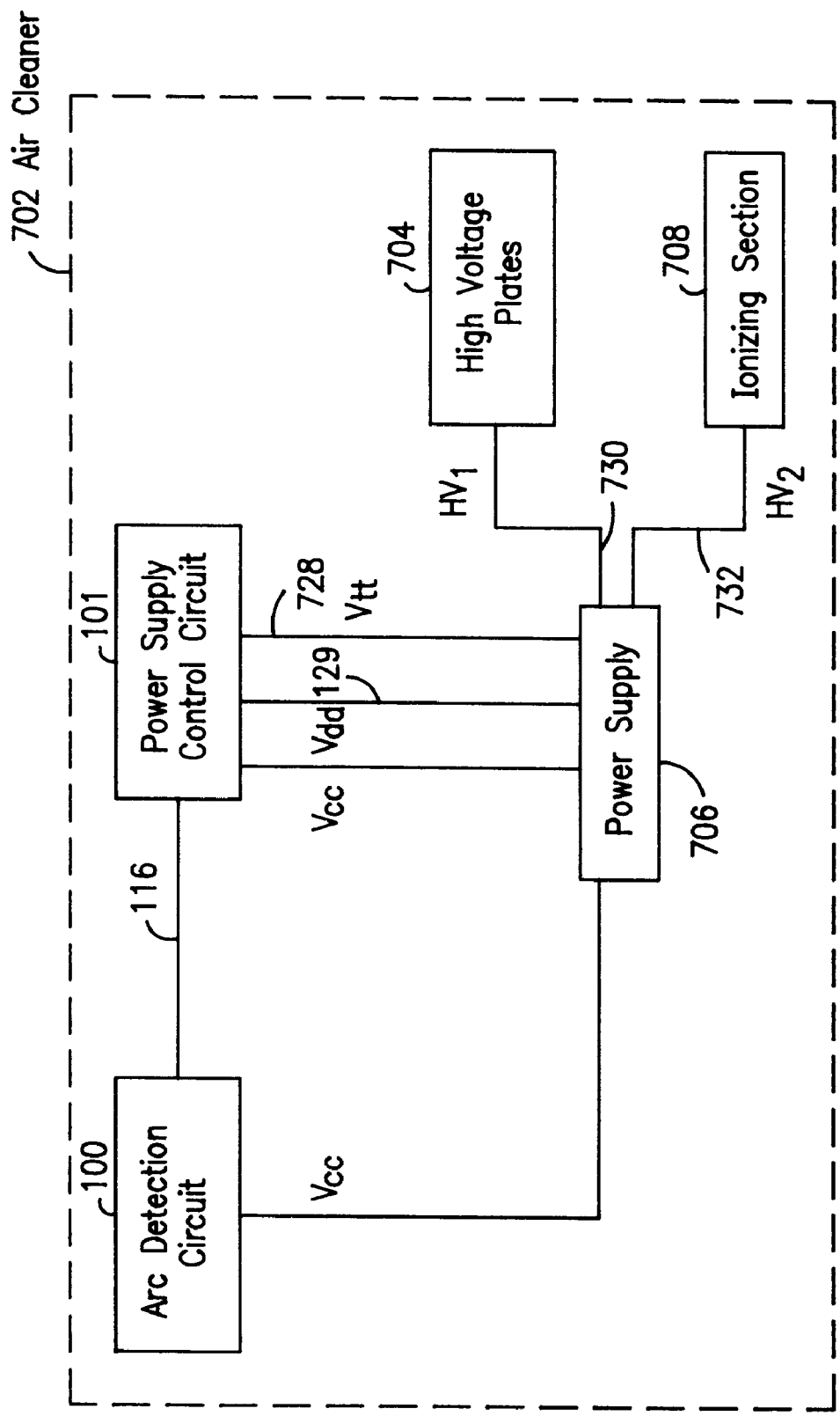
FIG. 7 illustrates a block diagram of internal components within an electrostatic air cleaner in accordance with another embodiment of the invention.

FIG. 7 shows a block diagram of an electrostatic air cleaner 702 in accordance with another embodiment of the invention, including the arc detection circuit 100, the power supply control circuit 101, a power supply 706, high voltage plates 704, and an ionizing section 708. The power supply 706 supplies a voltage $V_{dd}$ to the power supply control circuit 101 on line 129, and receives a voltage $V_{tt}$ from the power supply control circuit 101 on the line 728. When a proper voltage is supplied to the power supply 706 on line 728, the power supply 706 provides a first high voltage $HV_1$ on the line 730. Thus, when the solenoid switch 126 is closed so that $V_{tt}=V_{dd}$, a first high voltage $HV_1$ is provided on the line 730 to the high voltage plates 704. When the solenoid switch 126 is open, the first high voltage $HV_1$ is not provided on the line 730. The power supply 706 can also supply a second high voltage $HV_2$ on the line 732 to the ionizing section 708 of the air cleaner 702. This second high voltage $HV_2$ can also be supplied to the ionizing section 708 only when $V_{tt}=V_{dd}$. In accordance with electrostatic air cleaners known in the art, the second high voltage $HV_2$ can be, for example, equal to or greater than the first high voltage $HV_1$.

Figure 9:
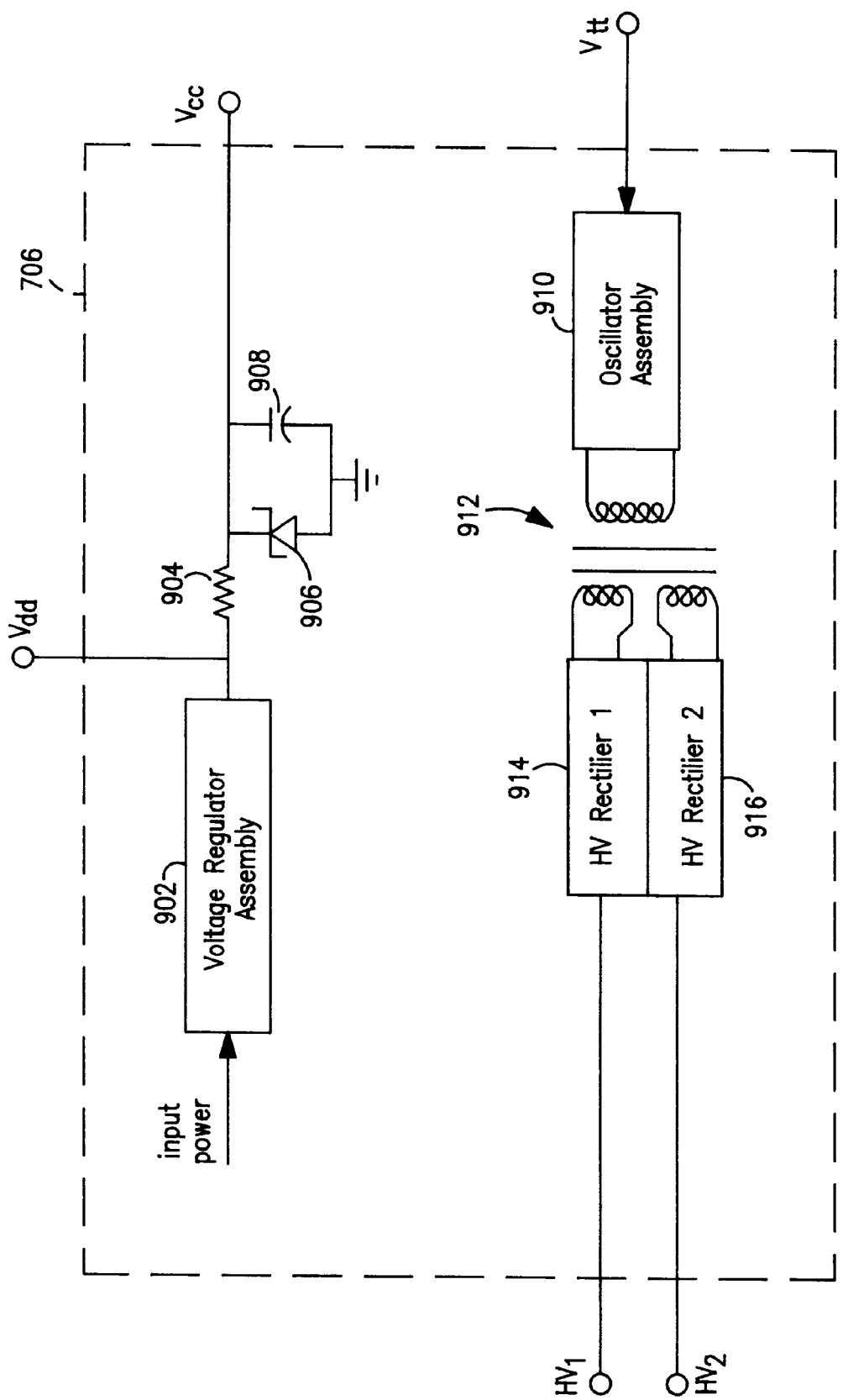
FIG. 9 is a block diagram of internal components of the power supply of FIG. 7, in accordance with an embodiment of the invention.

FIG. 9 shows a block diagram of internal components of the power supply 706 of FIG. 7, in accordance with principles well known in the art. As shown in FIG. 9, input power is provided to a voltage regulator assembly 902. An output of the voltage regulator assembly 902 provides the voltage $V_{DD}$. The resistor 904, zener diode 906 and the capacitor 908 together provide the voltage $V_{CC}$ based on the voltage $V_{DD}$, as shown in FIG. 9. The power supply 706 can also include an oscillator 910 for providing an AC voltage output based on the received voltage $V_{TT}$. The oscillator 910 can, for example, switch the voltage $V_{TT}$ with respect to ground to provide an AC output voltage have a square wave shape. An output of the oscillator 910 is provided to a step-up transformer assembly 912, which has two high-voltage AC outputs that are respectively provided to the HV (High Voltage) rectifier assemblies 914 and 916 to generate the output voltages $HV_1$ and $HV_2$. The rectifier assemblies 914 and 916 can include, for example, filtering circuitry to smooth the output voltages $HV_1$ and $HV_2$. Those skilled in the art will recognize that the high voltage plate assembly 604 shown in FIG. 6 can include the oscillator 910, the transformer assembly 912 and one or more of the rectifier assemblies 914 and 916.

In summary, the disclosed embodiments of the invention variously provide multiple advantages, especially when implemented in an electronic air cleaner that uses a high voltage power supply to filter particles out of the air. First, noise generated by arcing is limited to a short duration tapping sound instead of a rapid succession of pops and crackles, because the power supply for the arcs is disconnected when an arc is detected. Second, subsequent arcs are prevented when an arc across debris trapped between arcing surfaces is detected, because disconnecting the power supplying the arc allows the debris to fall out from between the arcing surfaces within a cleaning cell, or to pass through the cleaning cell with an air flow. Third, a microprocessor included in the arc detection and power supply control circuits allows arcing to be monitored and power to be controlled in sophisticated ways that optimize performance and user-friendliness of the system. Fourth, arc-generated interference with other devices such as televisions and radios is reduced. Additional advantages will be apparent to those skilled in the art.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. The invention could be used with devices other than electric air filters to control arcing, for example with any device that generates undesired arcs that can be interrupted or controlled if detected. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. An electrostatic air cleaner having a high voltage plate assembly and a power supply for powering the high voltage plate assembly, comprising:

an antenna for receiving electromagnetic signals generated by an arc in the high voltage plate assembly;

an arc detection circuit for detecting the arc based on the electromagnetic signals received by the antenna; and a power supply control circuit for disconnecting the power supply from the high voltage plate assembly for a predetermined length of time when the arc detection circuit detects the arc, and reconnecting the power supply to the high voltage plate assembly upon expiration of the predetermined length of time.

2. The arc control device of claim 1, wherein the antenna includes electrically conductive traces on a printed circuit board and at least one electrically conductive member extending from the printed circuit board.

3. A method for controlling arcing in an electrostatic air cleaner having a high voltage plate assembly powered by a power supply, comprising the steps of:

receiving electromagnetic signals generated by an arc in the high voltage plate assembly;

identifying the presence of the arc based on the received electromagnetic signals;

disconnecting the power supply from the high voltage plate assembly for a predetermined length of time in response to the identification; and automatically reconnecting the power supply to the high voltage plate assembly when the predetermined length of time expires.

4. The method of claim 3, further comprising the step of:

after the step of identifying, automatically performing a wash cycle to remove debris from the high voltage plate assembly.

5. The method of claim 3, further comprising the step of:

determining the predetermined length of time based on an elapsed time between two most recent arcs.

6. The method of claim 3, further comprising the step of:

determining the predetermined length of time based on a number of arcs that occur within a predetermined time interval.

7. The method of claim 3, further comprising the step of:

creating a record of arc occurrences over a period of time.

8. The method of claim 3, further comprising the step of alerting a user after at least one arc presence in the high voltage plate assembly is identified.

* * * * *